United States Patent [19]

Lanham

[11] Patent Number: 5,251,520
[45] Date of Patent: * Oct. 12, 1993

[54] WRENCH FOR HEXAGONAL REGULAR NUTS AND LOCKNUTS

[75] Inventor: Thomas R. Lanham, Eggertsville, N.Y.

[73] Assignee: McGard, Inc., Orchard Park, N.Y.

[*] Notice: The portion of the term of this patent subsequent to Jul. 7, 2009 has been disclaimed.

[21] Appl. No.: 852,321

[22] Filed: Mar. 18, 1992

Related U.S. Application Data

[63] Continuation-in-part of Ser. No. 749,986, Aug. 26, 1991, Pat. No. 5,127,289, which is a continuation-in-part of Ser. No. 656,698, Feb. 19, 1991, abandoned.

[51] Int. Cl.$^5$ ............................................... B25B 15/00
[52] U.S. Cl. ........................................ 81/436; 81/437; 81/124.5
[58] Field of Search ................... 81/121.1, 125, 451, 81/124.4, 124.5, 437, 436

[56] References Cited

U.S. PATENT DOCUMENTS

| | | | |
|---|---|---|---|
| 1,619,255 | 3/1927 | Haynes | 81/124.5 X |
| 1,898,726 | 2/1933 | Hess . | |
| 2,372,269 | 3/1945 | Golan | 81/121.1 |
| 2,613,565 | 10/1952 | Saunders | 81/53 |
| 2,613,942 | 10/1952 | Saunders | 279/72 |
| 3,241,408 | 3/1966 | McCauley | 81/436 |
| 3,396,765 | 8/1968 | Ridenour | 81/437 |
| 3,779,105 | 12/1973 | Triplett et al. | 81/121.1 |
| 4,724,730 | 2/1988 | Mader et al. | 81/53.2 |
| 4,945,789 | 8/1990 | Martinengo | 81/125 X |
| 5,127,289 | 7/1992 | Lanham | 81/437 X |

*Primary Examiner*—James G. Smith
*Attorney, Agent, or Firm*—Joseph P. Gastel

[57] ABSTRACT

A wrench for selectively turning a either conventional polygonal nut or a locknut having a key-receiving configuration onto a threaded stud including a wrench body, a polygonal bore in the wrench body, a rectilinearly slidable bit in the bore and biased to an outwardly extending position by a spring, a nose on the bit for mating engagement with the key-receiving configuration of the locknut, a first shoulder within a counterbore of the wrench body for engaging an end of the locknut, the bit being retractable against the bias of the spring when the polygonal nut is inserted into the polygonal bore for mating engagement therewith, and a second shoulder on the wrench body for engaging a shoulder on the polygonal nut. A wrench for turning a polygonal nut having a bore therein including a plunger having a tip thereon for entering the bore in stable supporting relationship, a spring for holding a polygonal nut in encircling relationship and an internal configuration in the wrench for turning the polygonal nut. A wrench for turning a locknut having a bore therein including a plunger having a tip thereon for entering the bore in stable supporting relationship, a bit slidable in the bore for holding a locknut in turning relationship, an internal surface in the bit for releasably holding the locknut, and an internal configuration in the wrench for turning the bit. A wrench for turning either a locknut or a conventional polygonal nut having the structure of the two immediately preceding sentences.

24 Claims, 8 Drawing Sheets

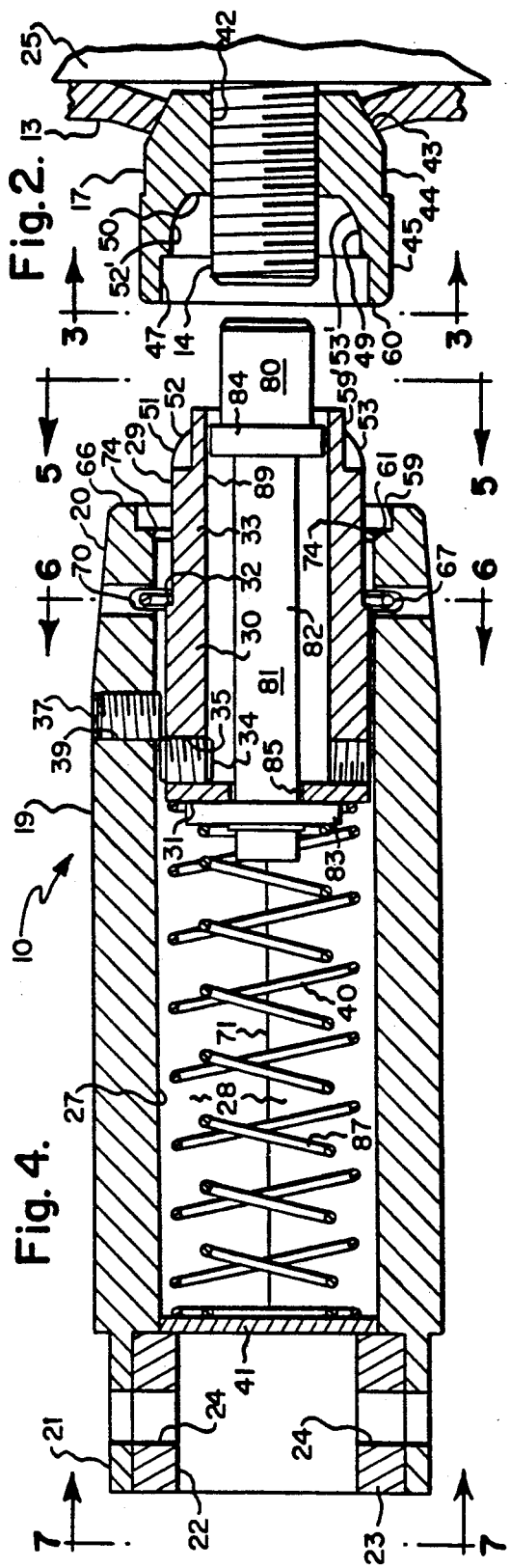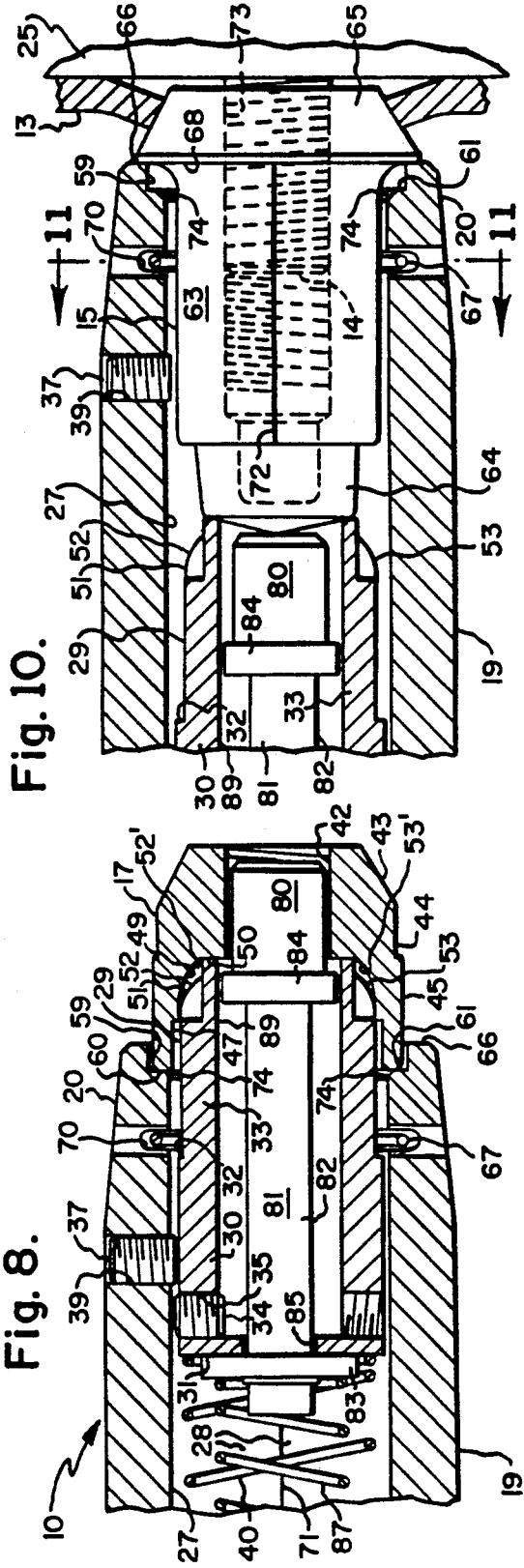

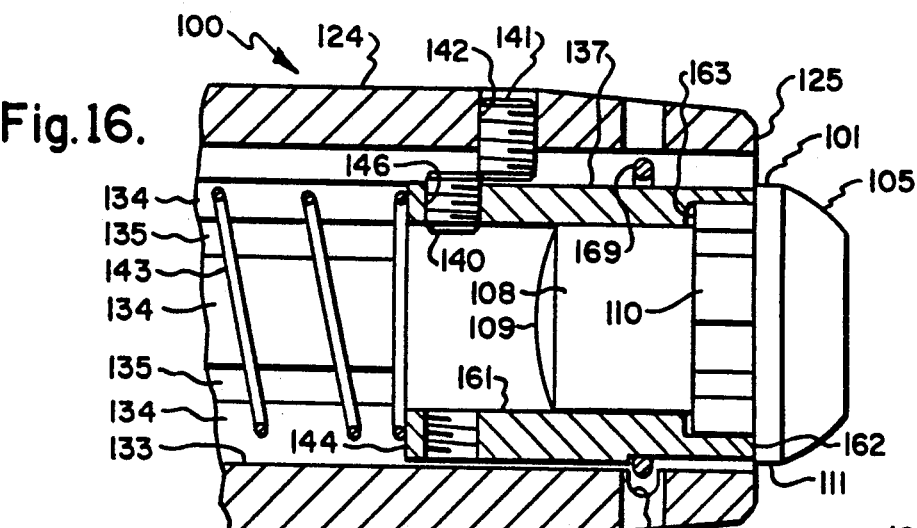
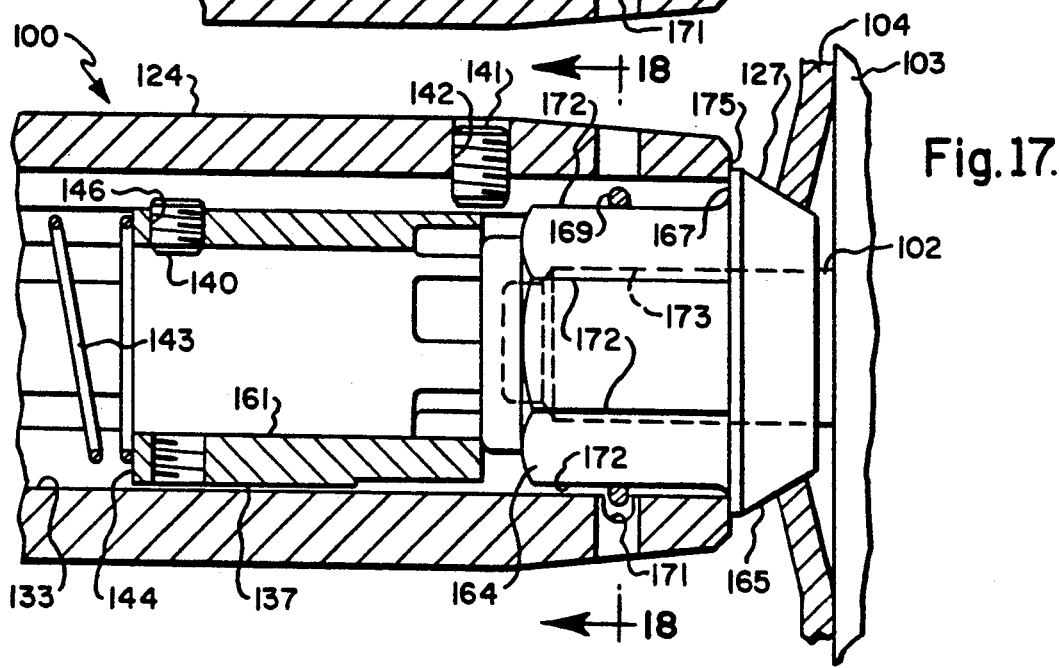
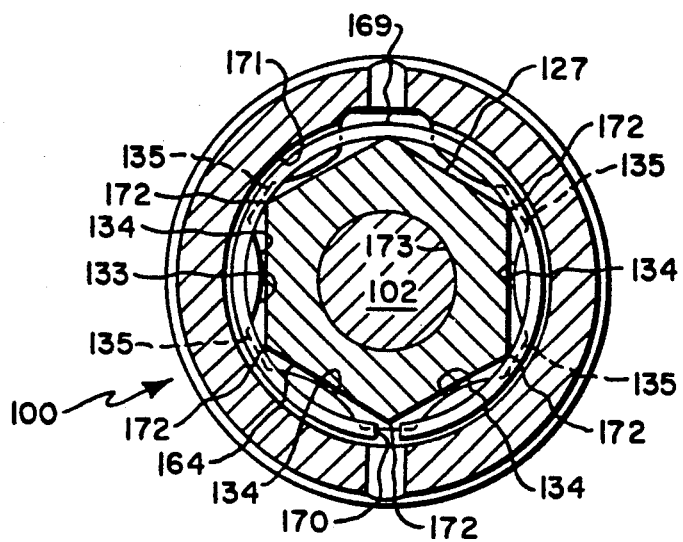

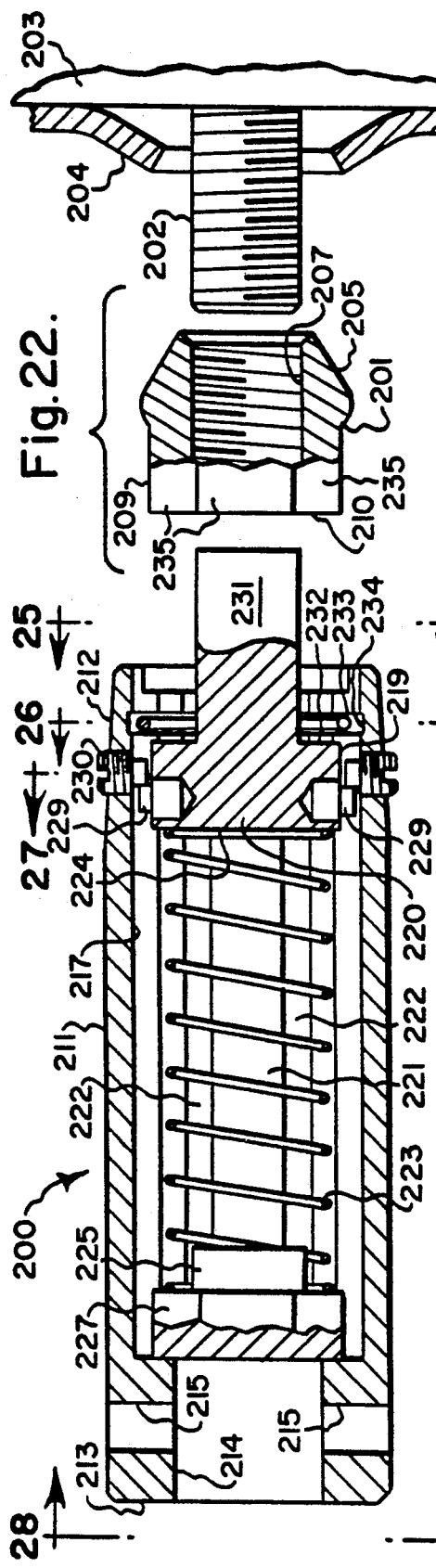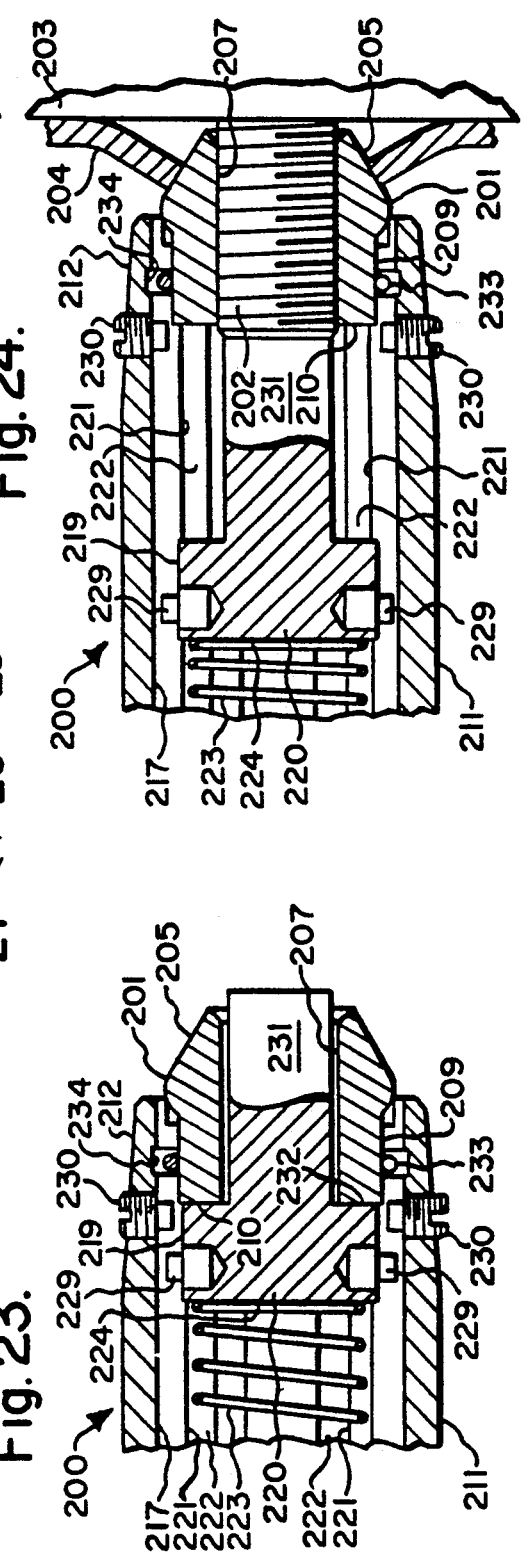

WRENCH FOR HEXAGONAL REGULAR NUTS AND LOCKNUTS

CROSS REFERENCE TO RELATED APPLICATION

The present application is a continuation-in-part of application Ser. No. 749,986, filed Aug. 26, 1991, which is now U.S. Pat. No. 5,127,289, issued Jul. 7, 1992, which is a continuation-in-part of application Ser. No. 656,698, filed Feb. 19, 1991, now abandoned.

BACKGROUND OF THE INVENTION

The present invention relates to a single wrench for automatically selectively turning either conventional polygonal nuts or locknuts and to a wrench for turning only conventional nuts, with both types of wrenches supporting the nuts in an extremely stable manner.

By way of background, in the automotive industry, wheel rims are mounted on axle studs by means of a plurality of nuts. In certain automobiles, where the rims and tires are very valuable, a plurality of conventional polygonal nuts and one locknut are used to secure the rim to the axle studs. The polygonal nuts can be removed by any conventional wrench. The locknut can only be removed by a specialized key-type of wrench because a conventional wrench cannot grip it. The foregoing arrangement guards against unauthorized removal of the wheel rim from its associated studs.

In the past, insofar as known, the polygonal nuts were installed by means of a first wrench mounted on a pneumatic gun and the cylindrical locknuts were installed by a second wrench. This procedure required more handling and effort than if a single wrench could perform both tasks. The wrenches of the above-noted patent applications of which the present application is a continuation-in-part disclosed single wrenches which could turn both conventional nuts and locknuts.

SUMMARY OF THE INVENTION

It is one object of the present invention to provide an improved wrench construction which is capable of supporting either a polygonal nut or a locknut in an extremely stable manner and selectively turning either a regular polygonal nut or a locknut, thereby facilitating the accurate installation of a plurality of such different nuts onto a wheel rim with the attendant saving of time and effort.

Another object of the present invention is to provide an improved wrench construction for supporting a polygonal nut in an extremely stable manner before turning it so that it will be properly aligned with a stud onto which it is to be threaded. Other objects and attendant advantages of the present invention will readily be perceived hereafter.

The present invention relates to a wrench for turning a nut having a threaded bore therein comprising a wrench body having a bore therein and an open end, first means proximate said open end for entering said threaded bore and mounting said nut thereon, second means proximate said open end for releasably supporting said nut while said first means is located in said threaded bore, third means proximate said open end for effecting a turning relationship with said nut, and fourth means for exerting a yieldable force on said first means to permit said first means to move out of said threaded bore of said nut as a stud enters said threaded bore as said nut is being mounted on said stud.

The present invention also relates to a wrench for selectively turning either a conventional polygonal nut having a threaded bore therein or a locknut having a threaded bore therein comprising a wrench body having a bore therein and an open end, first means proximate said open end for entering said threaded bore of either said conventional polygonal nut or said locknut and mounting either of said nuts thereon, second means proximate said open end for releasably supporting either of said nuts while said first means is located in said threaded bore, third means proximate said open end for effecting a turning relationship with either of said nuts, and fourth means for exerting a yieldable force on said first means to permit said first means to move out of said threaded bore of either of said nuts as a stud enters said threaded bore of either of said nuts as it is being mounted on said stud.

The various aspects of the present invention will be more fully understood when the following portions of the specification are read in conjunction with the accompanying drawings wherein:

BRIEF DESCRIPTION OF THE DRAWINGS

FIG. 2 is an enlarged fragmentary cross sectional view of the locknut mounted on an associated stud and taken substantially along line 2—2 of FIG. 1;

FIG. 4 is a cross sectional view taken substantially along line 4—4 of FIG. 5 and showing the wrench of the present invention for driving either a conventional polygonal nut or a locknut;

FIG. 8 is a fragmentary cross sectional view similar to FIG. 4 but showing a locknut mounted on the wrench;

FIG. 10 is a view similar to FIG. 8 but showing a conventional polygonal nut mounted on the wrench tool;

FIG. 16 is a fragmentary enlarged cross sectional view of the end of the wrench mounting the locknut of FIG. 12 in driving relationship;

FIG. 17 is an enlarged fragmentary view of the wrench mounting a conventional hexagonal nut in driving relationship;

FIG. 18 is a cross sectional view taken substantially along line 18—18 of FIG. 17 and showing the conventional nut held within the wrench by a spring;

FIG. 22 is a fragmentary exploded cross sectional view of another embodiment of a wrench which is capable of holding conventional polygonal nuts in a stable manner and showing a conventional polygonal nut in spaced relationship to the wrench and to a stud on which it is to be mounted;

FIG. 23 is a fragmentary cross sectional view showing the conventional nut mounted on the wrench of FIG. 22;

FIG. 24 is a fragmentary cross sectional view showing the relative positions of portions of the wrench and the conventional polygonal nut after the latter is mounted on its associated stud and the wrench is still in engagement with the nut;

DESCRIPTION OF THE PREFERRED EMBODIMENT

Figure 1:
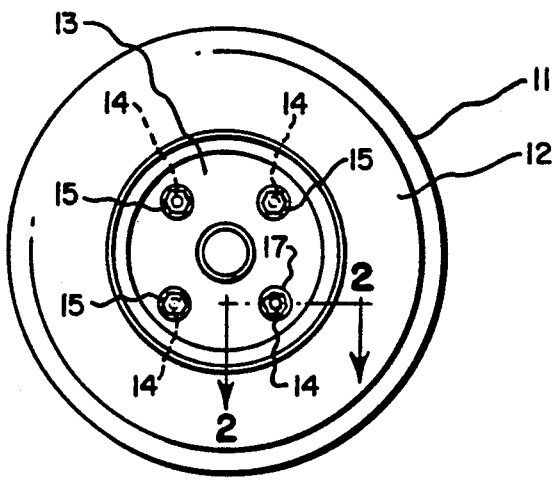
FIG. 1 is a side elevational view of an automotive wheel wherein the rim is mounted by a plurality of conventional polygonal nuts and a cylindrical locknut which can be installed and removed from an associated stud only with a specialized key.
Figure 3:
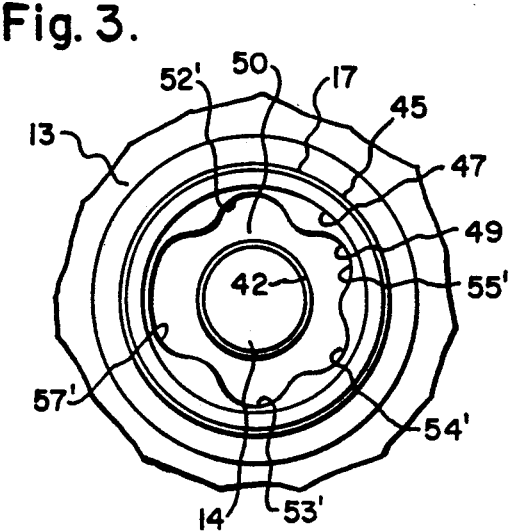
FIG. 3 is a fragmentary view taken substantially in the direction of arrows 3—3 of FIG. 2 and showing the face of the locknut.
Figure 5:
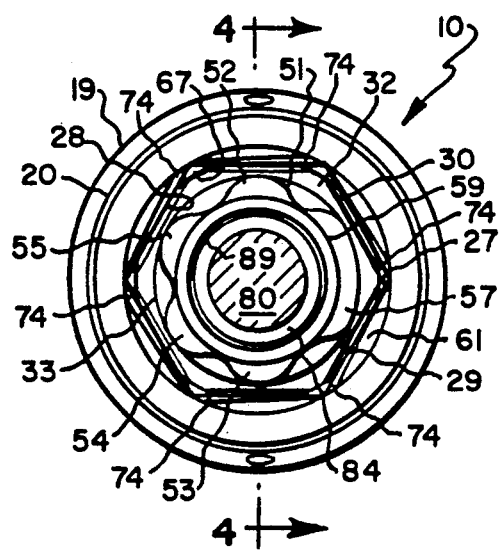
FIG. 5 is an end elevational view, partially in cross section, taken substantially in the direction of arrows 5—5 of FIG. 4.

Summarizing briefly in advance, the wrench 10 (FIG. 4) of the present invention is adapted to be mounted on a pneumatic gun (not shown) which is used for tightening nuts onto the studs on which an automotive wheel rim is mounted. The wrench 10 is capable of tightening both conventional nuts and locknuts. In this respect, an automotive wheel 11 which includes a tire 12 mounted on rim 13 is mounted on studs 14 by a plurality of conventional polygonal nuts 15 and a locknut 17. The locknut 17 prevents unauthorized removal of the wheel from the studs on which it is mounted because it requires a special key to unscrew it.

The wrench 10 is for the purpose of installing both conventional nuts 15 and a locknut 17 onto the studs 14 so that two different wrenches are not required for this purpose. Accordingly, assembly of the wheels onto cars in the automobile factory is facilitated by decreasing both the effort and time required for this task.

The wrench 10 includes a hollow metal wrench body 19 having a front end 20, for turning either locknut 17 or conventional nut 15, and a rear end 21 having a square opening 22 in a block 23 which is press-fitted into body 19. Square bore 22 is for the purpose of receiving a mating driving member of a pneumatic gun. Bores 24 receive ball detents on the driving member for holding wrench body 19 therein.

As noted above, wrench 10 can selectively drive conventional polygonal nuts 15 or a cylindrical locknut 17 onto studs 14 which extend outwardly from plate 25 attached to the automotive axle. Body 19 has a hexagonal bore 27 therein having sides 28. A locknut driving bit 29 has a hexagonal rear portion 30 of a size for free rectilinear sliding movement in hexagonal bore 27. The hexagonal portion 30 extends between bit end 31 and shoulder 32 at the junction of hexagonal portion 30 and a cylindrical portion 33. A set screw 34 is threaded into a bore 35 in bit 29. Another set screw 37 is threaded into a bore 39 in body 19. A light spring 40 has one end bearing on the end 31 of bit 29 and its opposite end bearing on plate 41 which bears against block 23 to thereby bias bit 29 to the position shown in FIG. 4. In this respect it is to be noted that there is a clearance between the end of set screw 34 and the hexagonal bore 27, and there is also a clearance between the end of set screw 37 and the outer hexagonal surface of bit 29. The only purpose for set screws 34 and 37 is so that they engage each other as shown in FIG. 4 to prevent spring 40 from ejecting bit 29 from wrench body 19. A keyway of very small depth (not shown) is located in the side 28 of hexagonal bore 27 in opposition to the top of set screw 34 to further insure clearance between the top of set screw 34 and the side 28 of bore 27 so that there will be no binding therebetween as the bit 29 moves in the bore. Set screws 34 and 37 will in no way impede free movement of bit 29 within hexagonal bore 27 between plate 41 and set screw 37 because of the clearances stated above.

Bit 29 is for the purpose of driving locknut 17 onto stud 14. In this respect locknut 17 includes an internally threaded portion 42 which threads onto stud 14. It also includes a frustoconical nose portion 43 proximate a first cylindrical portion 44 which is located proximate a second cylindrical annular portion 45. A cylindrical inner surface 47 is located at the end of locknut 17, and an internal irregular grooved surface 49 is located between internal cylindrical surface 47 and shoulder 50. The nose 51 of bit 29 has an irregular series of lobes 52, 53, 54, 55 and 57 for mating into groove portions 52', 53', 54', 55' and 57', respectively, of groove 49. The nose 51 terminates at a small cylindrical lip 59.

Figure 9:
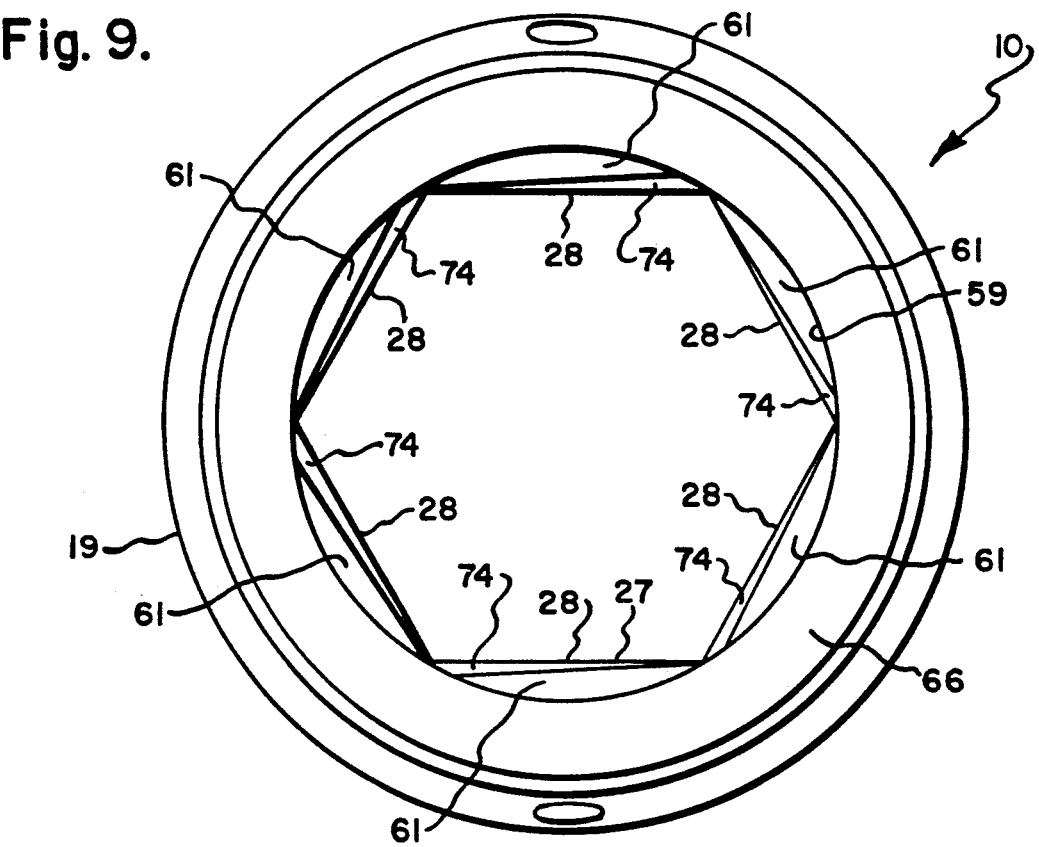
FIG. 9 is an enlarged view taken substantially in the direction of the arrows 5—5 of FIG. 4 of the wrench body with the bit removed and showing the camming surfaces for orienting a hexagonal nut into alignment with the hexagonal bore in the wrench body.

The manner in which locknut 17 fits into the nose portion 20 of body 19 is shown in FIG. 8. In this respect, the outer surface of cylindrical end 45 fits into counterbore 59 and the annular end 60 of locknut 17 bears against segments 61 (FIG. 9) at the end of counterbore 59. Segments 61 are defined by the intersections of the sides of hexagonal bore 27 and counterbore 59. At this time bit 29 will be forced to the partially retracted position of FIG. 8 from the position of FIG. 4. The size relationship between cylindrical portion 45 of the locknut and the internal diameter of counterbore 59 is such that the locknut will be loosely retained in position within the counterbore while it is also supported on tip 80 of slidable plunger 81 which fits into tapped bore 42 of nut 17 while the wrench 10 approaches the stud 14. It will be appreciated that locknut 17 will be rotated when body 19 is rotated by the pneumatic gun because of the hexagonal fit between rear portion 30 of bit 29 and hexagonal bore 27. If the lobes 52, 53 etc. of the bit are not aligned with groove portions 52', 53', etc., the frictional fit between the bit and the locknut will turn the latter initially to screw it onto stud 14. This frictional fit is primarily between the shoulder provided by segments 61 and the annular end 60 of locknut 17. Also there may be frictional engagement between the outer surface of nut 17 and the cylindrical side of counterbore 59. When the locknut encounters sufficient resistance against turning, the bit 29 will turn relative thereto and the lobes will move into the grooves of the locknut to provide a keyed relationship therewith to complete the tightening of the locknut onto the stud.

Plunger 81 includes a central portion 82 and an enlarged collar 83 on the end thereof. An enlarged collar 84 is located at the junction of tip 80 and central portion 82. Also, an aperture 85 is located at the end of bit 29. A spring 87 has one end bearing on plate 41 and the opposite end bearing on collar 83. Thus, as locknut 17 is threaded onto stud 14 and the latter enters internally threaded bore 42 of nut 14, the plunger 81 will be retracted to the left in FIG. 8 against the bias of spring 87. During the axial movement of plunger 81 in bit 29, there is a sliding relationship between collar 84 and the inner surface 89 of the bit 29, and there is also a sliding relationship between the central pin portion 82 and the border of aperture 85. These two sliding relationships guide plunger 81 for rectilinear movement. In this manner, locknut 17 is driven onto one of the studs 14. It is to be noted that when bit 29 is caused to move from the position of FIG. 4 to the position of FIG. 8, it will do so against the bias of springs 40 and 87.

Figure 6:
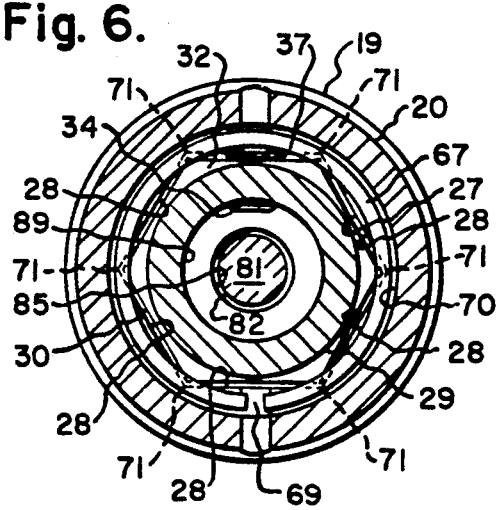
FIG. 6 is a cross sectional view taken substantially along line 6—6 of FIG. 4 and showing the spring construction for releasably holding a polygonal nut.
Figure 7:
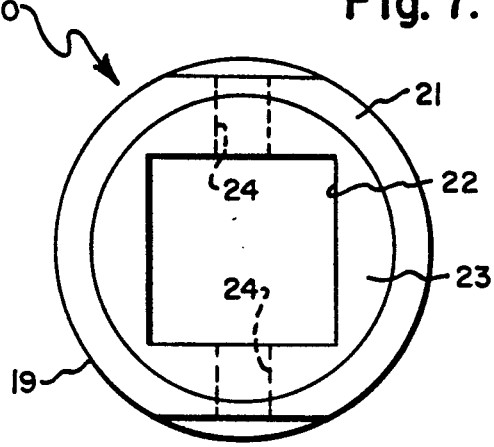
FIG. 7 is an end elevational view taken substantially in the direction of arrows 7—7 of FIG. 4 and showing the end of the wrench tool which receives a driving member from a pneumatic gun.
Figure 11:
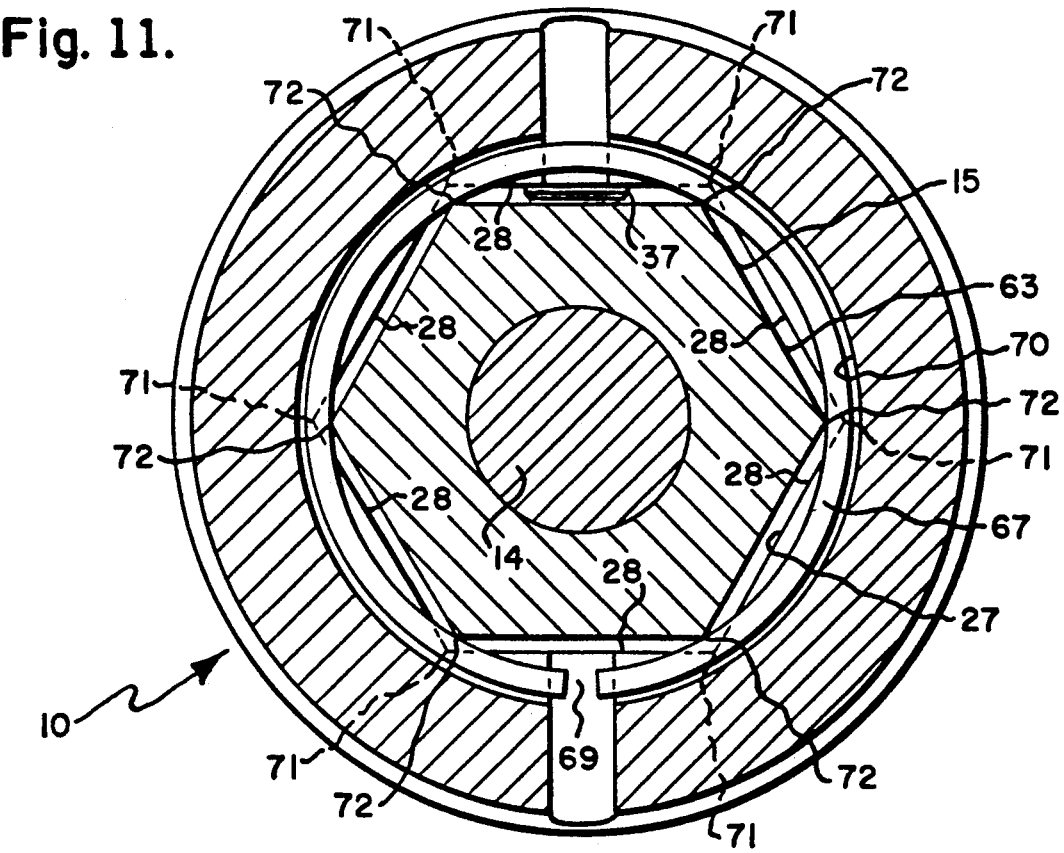
FIG. 11 is a cross sectional view taken substantially along line 11—11 of FIG. 10 and showing how a spring in the wrench body retains a polygonal nut therein.

As noted above, the wrench 10 is also selectively capable of threading a conventional polygonal type of nut 15 onto a stud 14. In this respect, this particular conventional nut 15 includes a hexagonal body portion 63 having a frustoconical end 64 and a frustoconical nose 65 which terminates at shoulder 68 at the junction between the nose and the hexagonal portion 63. A split ring type of spring 67 has a continuous periphery and is split at 69 (FIGS. 6 and 11). Spring 67 is positioned in annular groove 70 in wrench body 19. The normal internal diameter of spring 67 is smaller than the distance between opposed vertices such as 71 of hexagonal bore 27. The vertices 71 are located at the intersection of sides 28 of the bore (FIG. 6). Furthermore, the internal diameter of spring 67 is smaller than the distance across the diametrically opposite vertices 72 of hexagonal nut portion 63. Therefore, when the nut 15 is inserted into hexagonal bore 27, the vertices 72 (FIG. 10) of hexagonal nut portion 63 will bear against the adjacent portions of split spring 67 which protude inwardly beyond hexagonal bore vertices 71, and thus ring spring 67 will exert a biasing force on hexagonal nut body portion 63 to retain it within the nose 20 of wrench body 19. Thus the frustoconical end portion of nut 15 can be placed onto a stud 14 so that the internally threaded portion 73 thereof can be threaded onto stud 14. When the hexagonal nut 15 is located in hexagonal bore 27, there will be a driving relationship established therebetween. After nut 15 has reached its final tightened position on rim 13, wrench 10 can be withdrawn and spring 67 will return to its unstressed condition and move the bit 29 to the position of FIG. 4. When nut 15 is in the position of FIG. 10, shoulder 68 thereof will bear against annular end 66 of nose 20.

The extreme edge of each side 28 of hexagonal bore 27 at nose end 20 is chamfered to produce inclines 74 (FIG. 9) which are camming surfaces which will tend to rotate the hexagonal nut 17 into aligned position within hexagonal bore 27 in the event the vertices of the nut are not aligned with the vertices of the hexagonal bore when the nut is first inserted into the nose end 20. In this respect, if the vertices are not aligned, the inclined chamfered surfaces will produce a camming action on the vertices of the nut to rotate its hexagonal portion into alignment with the hexagonal bore.

It is to be noted that when nut 15 is held within wrench 10, as shown in FIG. 10, bit 29 and plunger 81 are both in retracted positions against the bias of springs 40 and 87, and when the nut 15 has been removed from its position of FIG. 10, the bit 29 and plunger 81 will be returned to the positions of FIG. 4 under the bias of springs 40 and 87.

While the locknut 17 has been shown as having a surface of revolution which is cylindrical, it will be appreciated that by suitably modifying the opening in end 20 of wrench body 19, locknuts having a frustoconical outer surface can also be turned by wrench 10, especially considering the supporting capability of plunger 81.

Figure 13:
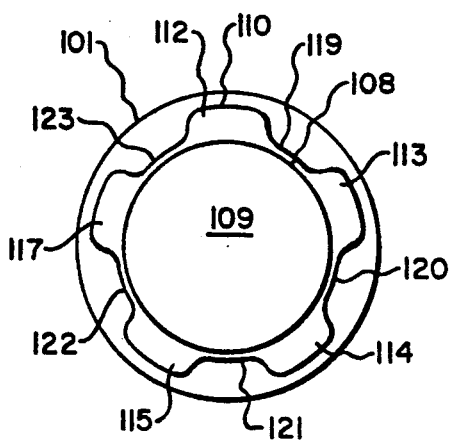
FIG. 13 is an end elevational view of the locknut of FIG. 12 taken substantially in the direction of arrows 13—13 of FIG. 12.
Figure 12:
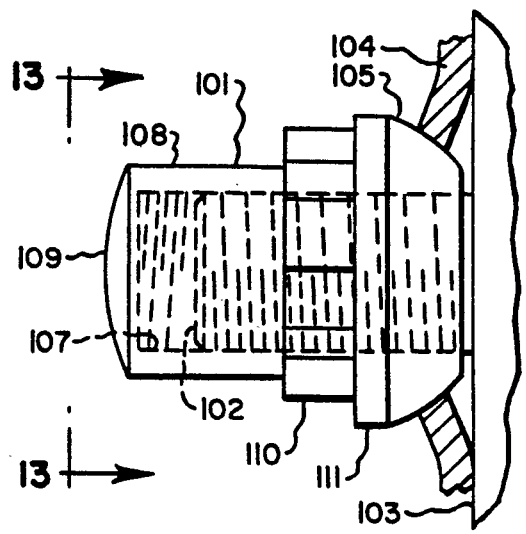
FIG. 12 is a fragmentary side elevational view, partially in cross section, showing another type of locknut in position on a wheel rim.

The wrench 100 of FIGS. 14–18 is a modified form of the present invention which is also adapted to be mounted on a pneumatic gun (not shown) which is used for tightening nuts onto the studs on which an automotive wheel rim is mounted. The wrench 100 is capable of tightening both conventional nuts and locknuts 101 (FIGS. 12 and 13) of a different type than locknuts 17 described above, one of which is shown in position on the end of stud 102 extending outwardly from plate 103 on the automotive axle. Locknut 101 includes a curved nose 105 which bears against wheel rim 104. It also includes a tapped bore 107 which receives stud 102 in threaded relationship. The end remote from nose 105 includes a cylindrical body portion 108 and a curved end 109. A key-receiving configuration 110 is located between rim 111 of curved nose 105 and cylindrical body portion 108. The key-receiving portion 110 includes a plurality of lobes 112, 113, 114, 115 and 117 with grooves 119, 120, 121, 122 and 123 therebetween. The lobes and grooves may be spaced in any desired relationship for receiving a mating key, not shown.

The wrench 100 includes a hollow metal wrench body 124 having a front end 125, for turning either locknut 101 or conventional hexagonal nut 127 (FIG. 17), and a rear end 129 having a square opening 130 in a block 131 which is press-fitted into body 124. Square bore 130 is for the purpose of receiving a mating driving member of a pneumatic gun. Bores 132 receive ball detents on the driving member for holding wrench body 124 thereon.

Figure 14:
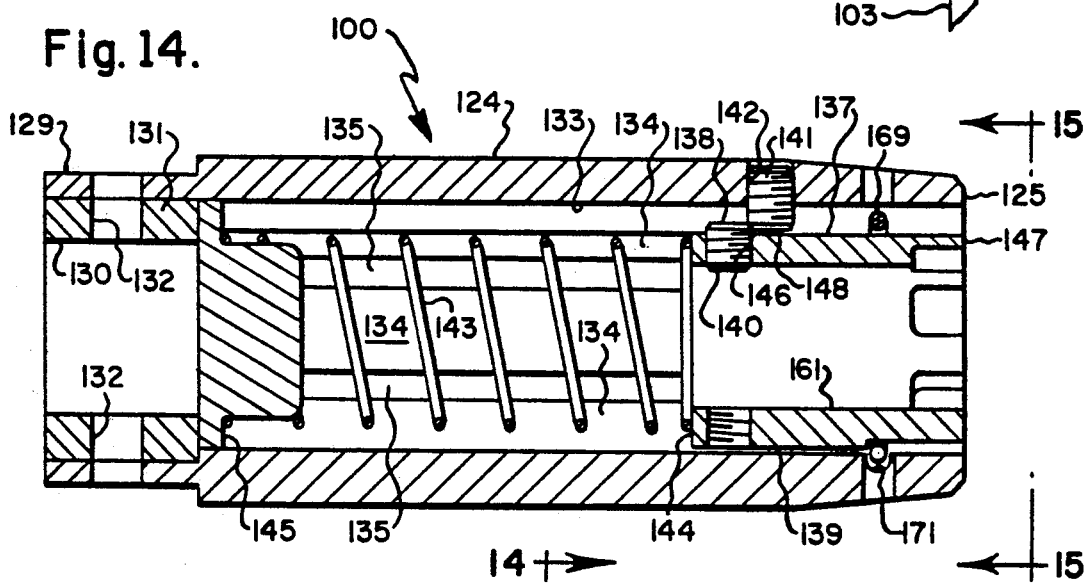
FIG. 14 is a cross sectional view taken substantially along line 14—14 of FIG. 15 and showing a wrench which is capable of driving either a conventional polygonal nut or the locknut of FIG. 12.

Body 124 has a generally hexagonal bore 133 therein having curved sides 134 therein with side portions 135 therebetween. A locknut driving bit 137 has a hexagonal outer surface portion 139 of a size for free rectilinear sliding movement in bore 133. A set screw 140 is threaded into a bore 146 in bit 137. Another set screw 141 is threaded into a bore 142 in body 124. A spring 143 has one end bearing on the end 144 of bit 137 and its opposite end bearing on plate 145 which bears against block 131 to thereby bias bit 137 to the position shown in FIG. 14. In this respect it is to be noted that there is a clearance between the outer end 138 of set screw 140 and the hexagonal bore 133, and there is also a clearance between the end 148 of set screw 141 and the outer hexagonal surface 139 of bit 137. The only purpose for set screws 140 and 141 is so that they engage each other as shown in FIG. 14 to prevent spring 143 from ejecting bit 137 from wrench body 124. One of the straight sides 135 of the bore is spaced from the outer end 138 of set screw 140 to insure a clearance therebetween. Set screws 140 and 141 will in no way impede free movement of bit 137 within hexagonal bore 133 because of the clearances stated above.

Bit 137 is for the purpose of driving locknut 101 onto stud 102. In this respect, the nose 147 of bit 137 has a series of lobes 149, 150, 151, 152 and 153 (FIG. 15) for mating into groove portions 119, 120, 121, 122 and 123, respectively, of nut portion 110, and it has grooves 154, 155, 157, 159 and 160 for receiving lobes 112, 113, 114, 115 and 117 of nut portion 110.

The manner in which locknut 101 fits into the bit 137 is shown in FIG. 16. In this respect, the outer cylindrical surface 108 fits into bore 161 with a suitable clearance therebetween. In addition the lobes and grooves of each of the bit and locknut are shown in mating relationship in FIG. 16 without numerals thereon in the interest of clarity. It will be appreciated, however, that originally the lobes and grooves of the bit may not be in alignment with the grooves and lobes, respectively, of the locknut. However, the frictional engagement between cylindrical surface 108 and bore 161 and the contact between the ends such as 162 (FIG. 16) of the lobes on the bit 137 with the ends such as 163 of the lobes of the locknut will cause the bit to rotate the locknut onto the stud 102. A point will be reached, however, where the bit 137 will rotate relative to locknut 101 and the two parts will engage in interlocking relationship, as shown in FIG. 16, so that the wrench 100 will tighten locknut 101 to its proper tightness. During the tightening operation, bit 137 may be moved to the left in FIG. 16 against the bias of spring 143. It will be appreciated that locknut 101 will be rotated when body 124 is rotated by the pneumatic gun because of the hexagonal fit between outer portion 139 of bit 137 and the generally hexagonal bore 133.

Figure 15:
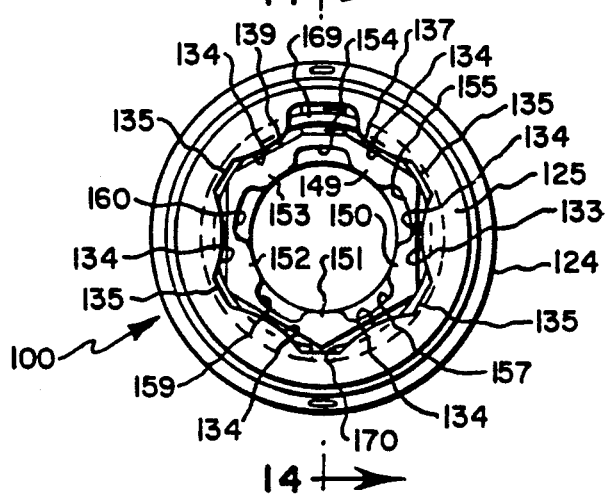
FIG. 15 is an end elevational view of the wrench taken substantially in the direction of arrows 15—15 of FIG. 14.

As noted above, the wrench 100 is also selectively capable of threading a conventional polygonal type of nut 127 onto a stud 102. In this respect, this particular conventional nut 127 includes a hexagonal body portion 164 having a frustoconical nose 165 which terminates at shoulder 167 at the junction between the nose 165 and the hexagonal portion 164. A split ring type of spring 169 has a continuous periphery and is split at 170 (FIGS. 15 and 18). Spring 169 is positioned in annular groove 171 in wrench body 124. The normal internal diameter of spring 169 is smaller than the distance across opposed side portions 135 of hexagonal bore 133 (FIG. 15). Furthermore, the internal diameter of spring 169 is smaller than the diameter of a circle defined vertices 172 of hexagonal nut portion 164. Therefore, when the nut 127 is inserted into hexagonal bore 133, the vertices 172 (FIG. 18) of hexagonal nut portion 164 will bear against the adjacent portions of split spring 169 which protude inwardly beyond side portions 135 of the hexagonal bore 133, and thus ring spring 169 will exert a biasing force on hexagonal nut body portion 164 to retain it within the nose of wrench body 124. Thus the frustoconical end portion of nut 127 can be placed onto a stud 102 so that the internally threaded portion 173 thereof can be threaded onto stud 102. When the hexagonal nut 127 is located in hexagonal bore 133, there will be a driving relationship established therebetween. Also when nut 127 is in the position of FIG. 17, shoulder 167 thereof will bear against annular end 175 of the nose. After nut 127 has reached its final tightened position on stud 102, wrench 100 can be withdrawn and spring 143 will return to its unstressed condition and move the bit 137 to the position of FIG. 14.

In order to enhance the seating of locknut 101 into its fully seated position of FIG. 16 within bit 137, the ends of the lobes of the bit can be chamfered in the manner discussed above relative to FIG. 9 so as to produce a camming action between the ends of the lobes on bit 137 and the ends of the lobes 112, 113, 114 etc. to promote the relative rotation therebetween resulting in the fully seated orientation of FIG. 16.

Figure 19:
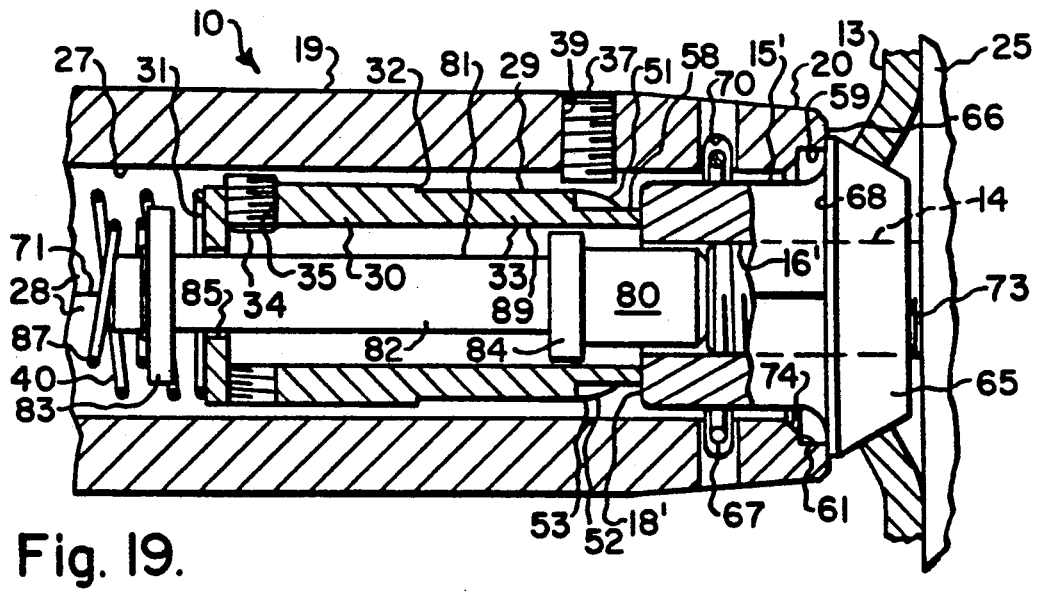
FIG. 19 is a reduced fragmentary cross sectional view of the embodiment of FIGS. 1—11 wherein a polygonal nut having a through bore is supported by both a plunger and a spring which bears on its outer periphery.
Figure 20:
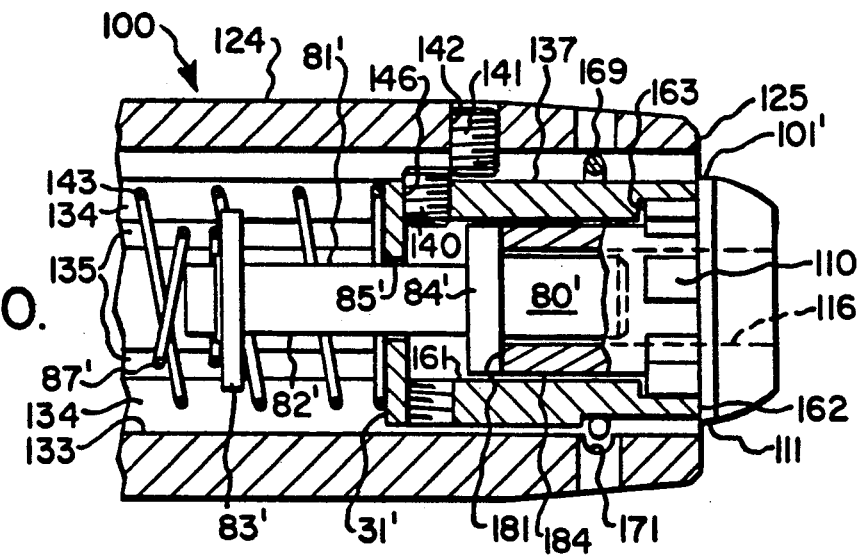
FIG. 20 is a reduced fragmentary cross sectional view similar to FIG. 16 but showing a modified embodiment wherein a plunger is associated with a bit for entering the open end of a locknut to provide additional support thereto.
Figure 21:
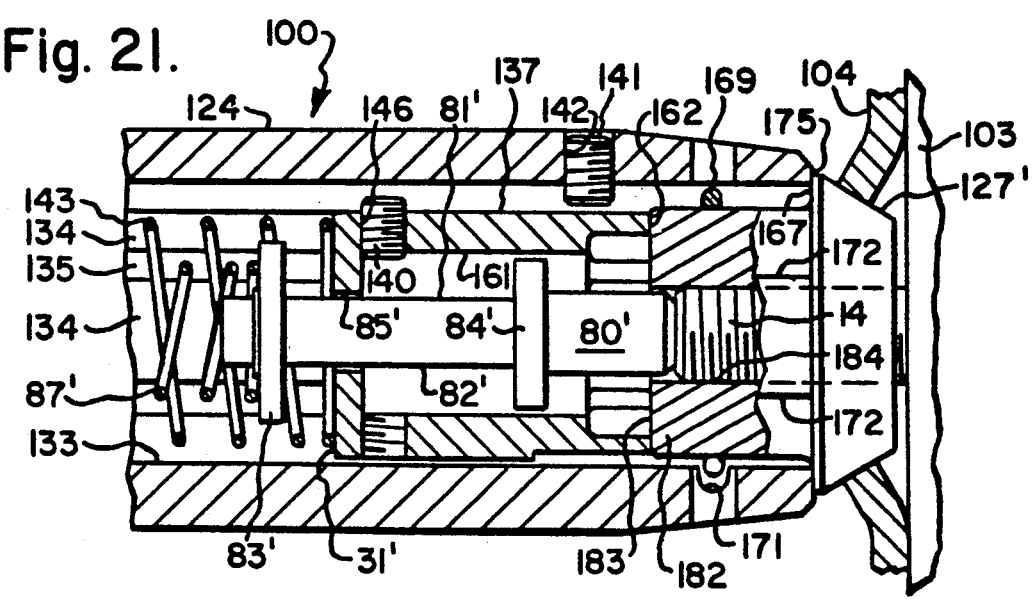
FIG. 21 is a reduced fragmentary cross sectional view of the embodiment of FIG. 20 but showing it supporting a polygonal nut by both the plunger which enters it and the spring which encircles it.
Figure 25:
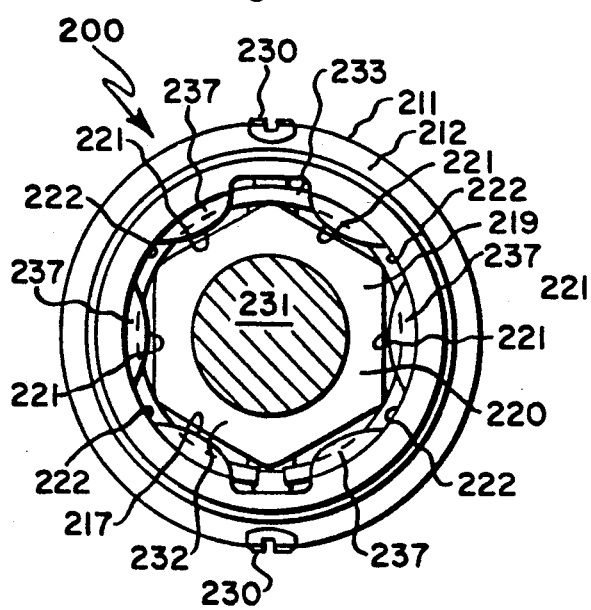
FIG. 25 is a cross sectional view taken substantially in the direction of arrows 25—25 of FIG. 22.
Figure 26:
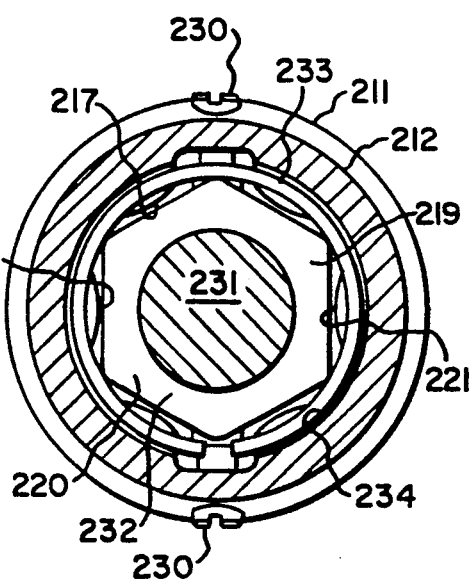
FIG. 26 is a cross sectional view taken substantially along line 26—26 of FIG. 22 and showing the manner in which the polygonal nut is held on the wrench.
Figure 27:
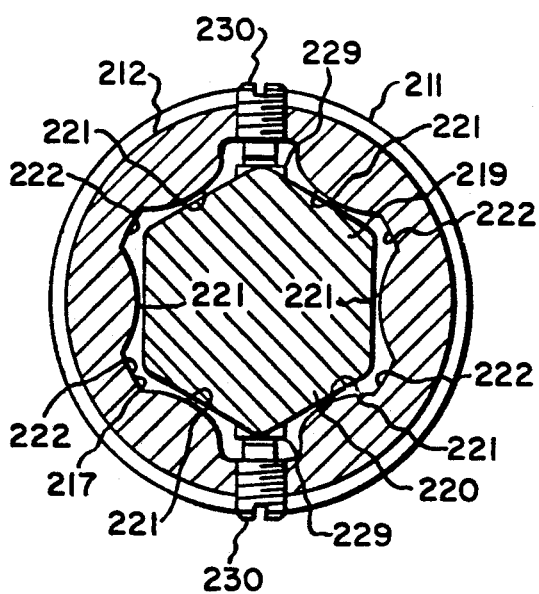
FIG. 27 is a cross sectional view taken substantially along line 27—27 of FIG. 22 and showing the relationship between the nut mounting member and the bore of the wrench in which it rides.
Figure 28:
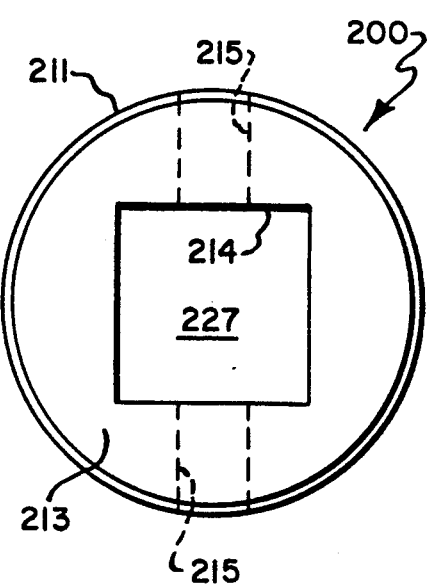
FIG. 28 is an end elevational view taken substantially in the direction of arrows 28—28 of FIG. 22.

In FIGS. 19-21 additional embodiments of wrenches are disclosed which support either a conventional polygonal nut or a locknut in an extremely stable manner and thereafter thread either of the nuts onto an associated stud. In addition, the tip of a plunger which protrudes from the wrench body enhances the mounting of the nuts onto the wrench.

In FIG. 19 a reduced view of the embodiment of FIGS. 1-11 is shown as mounting a conventional polygonal nut 15' having a through bore 16' which terminates at open end 18', and the tip 80 of plunger 81 is located in the tapped bore 16' to provide a close fit therewith and thus provide additional support thereto. In this respect, as can be seen from FIG. 4, originally the tip 80 protrudes beyond bit 29, as it would in FIG. 19 when the parts are in the position of FIG. 4. The bore 16' is installed over tip 80 when the latter is in the position of FIG. 4, and thus the tip 80 guides the nut onto the wrench body. Thereafter, it is pushed to the left in FIG. 4, and after it abuts the tip of bit 29 both will move rearwardly until nut 15' reaches the position of FIG. 19 wherein it is aligned axially with wrench body 19 and is retained therein by spring 67. Before nut 15' is screwed on to stud 14, collar 84 will bear against the end of the nut. Thus, nut 15' will be held in an extremely stable and aligned manner by tip 80, spring 67 and collar 84. Therefore, when the wrench body 19 is aligned with an associated stud, such as 14, it will thread itself thereon as the wrench body 19 is turned. It will be appreciated that the stabilization and alignment of nut 15' by tip 80, collar 84 and spring 67 tends to obviate the possibility that the nut will be driven onto the stud in a cocked attitude which would ruin the threads on the stud and thereby necessitate replacement of the stud. After the nut 15' is fully threaded onto stud 14, the plunger 81 will assume the position of FIG. 19 against the bias of spring 87. It will be appreciated that except for the use of the embodiment of FIGS. 1-11 for driving a polygonal nut 15', all parts of the embodiment of FIG. 19 are identical to those described above relative to FIGS. 1-11 and they bear the same numerals.

In FIGS. 20 and 21 a modification of the embodiment of FIGS. 14-18 is disclosed. In the embodiment of FIGS. 20 and 21 a plunger assembly and an associated spring, such as shown in FIGS. 1-11, has been added to wrench 100. Thus, the embodiment of FIGS. 20 and 21 is capable of utilizing the tip of a plunger as a support within the open end of either a locknut 101' (FIG. 20) or a polygonal nut 127' (FIG. 21)

In the embodiment of FIGS. 20 and 21, the plunger 81' is analogous to plunger 80 of FIGS. 1-11 and parts of plunger 81' which correspond to the parts of plunger 81 are designated by primed numerals corresponding to the unprimed numerals of FIGS. 1-11. It is therefore believed that an additional description of the plunger and its associated parts is not necessary. Furthermore, the numerals on the bit 137 and on the wrench body 124 which are identical to those in FIGS. 14-18 designate the same structure. In the embodiment of FIG. 20 a locknut 101' is disclosed which is identical to locknut 101 of FIG. 16 except that its rear end 181 is open to receive tip 80' of plunger 81' as shown in FIG. 20. The tip 80' of plunger 81' extends beyond the wrench body when the nut is initially being mounted on the wrench body, and thus it guides the nut onto the wrench body during mounting. Thus, nut 101' is supported in a stable manner by a close fit with tip 80', by a close fit between its outer surface 184 and the inner surface 161 of bit 137 which thus releasably supports the nut, by the keyed relationship between its pattern 110 and the mating key pattern at the lobes of the bit, and by collar 84' bearing against the annular end of nut 101'. Collar 84' prevents the nut from cocking and limits the amount of penetration of tip 80' into the bore of the nut.

In FIG. 21 the bit 137 and plunger 81' are shown in relationship to a nut 127' which has a hexagonal body 182 and an open end 183 which receives tip 80' of plunger 81' with a close fit. When the nut 127' is mounted on the end of wrench body 124 prior to the time that it is screwed onto stud 14, it is supported in a stable condition because tip 80' fits closely within bore 184, and collar 84' bears against the end 183 of the nut and spring 169 holds the body 182 in the same manner as described above relative to FIG. 17. After nut 127' is screwed onto stud 14, as shown in FIG. 21, plunger 81' is retracted against the bias of spring 87'. After the tool body 124 is removed from its position shown in FIG. 21, bit 137 will be urged to the right by spring 143 and collar 83' will bear against end 31' of the bit.

In FIGS. 22-28 a wrench 200 is disclosed for supporting a polygonal nut 201 in a stable manner and thereafter driving it onto threaded stud 202 after it has been so supported As in the previous embodiments, stud 202 extends outwardly from plate 203 on the automotive axle. Nut 201 includes a frustoconical nose 205 which bears against wheel rim 204 in its installed position. Nut 201 also includes a tapped bore 207 which extends throughout its length, and it receives stud 202 in threaded relationship. The end remote from nose 205 includes a hexagonal body portion 209 and an annular end 210.

The wrench 200 includes a hollow metal wrench body 211 having a front end 212 for turning nut 201. Wrench body 211 includes a rear end 213 having a square opening 214 for the purpose of receiving a mating driving member of a pneumatic gun. Bores 215 receive ball detents on the driving member for holding wrench body 211 thereon. Body 211 has a bore 217 therein which receives the hexagonal body 219 of plunger 220 in sliding relationship. In this respect, the bore 217 is of the cross-sectional configuration shown in FIG. 27 wherein there are six arcuate sides or lobes 221 separated by spaced portions 222. A spring 223 has one end bearing against the end 224 of plunger 220 and its other end encircling portion 225 of plate 227. In its normal position, plunger 220 is biased to the position shown in FIG. 22 wherein the outer ends of members 229 bear against the ends of screws 230.

Plunger 220 includes a tip 231 onto which the threaded bore 207 of nut 201 is slid with a slight clearance to provide a close fit. Thus, the tip 231 guides the nut onto the wrench body. When the end 210 of the nut engages the annular shoulder 232 of plunger 220 and nut 201 is moved to the left, plunger 220 will be moved from the position of FIG. 22 to the position of FIG. 23 against the bias of spring 223.

After nut 201 reaches the position of FIG. 23, it will be held within the tip 212 of body 211 by annular split spring 233 which is retained in groove 234. The normal relaxed diameter of spring 233 is smaller than the diametral distance across the vertices of hexagonal body 209 of nut 201, and thus when the nut is in the position of FIG. 23, spring 233 will exert an inward force on the vertices of body portion 209 of nut 201 to retain it within the end of the tool. It can thus be seen that nut 201 is held in a stable manner within the tool body 211 because it is supported on tip 231 of plunger 220 and held by spring 233. It is also supported by shoulder 232 bearing against its annular end. The sides 235 of the hexagonal body 209 are located opposite curved side portions 221 of bore 217 which produce a driving relationship with the sides 235 of the nut when the wrench body 211 is rotated. It is to be noted that the extreme ends 237 (FIG. 25) of lobes 221 may be chamfered as described above relative to FIG. 9 to cause the nut to rotate to a position wherein it is oriented in driving relationship with wrench end 212, in the event that its polygonal sides are not aligned with the lobes 221 when the nut is being inserted into the end 212 of the wrench.

After nut 201 is installed onto the tool as shown in FIG. 23, it is driven onto stud 202 as shown in FIG. 24. As the nut threads onto stud 202, the end 231 of plunger 220 will move to the left from the position of FIG. 23 to the position of FIG. 24 against the bias of spring 223. After the wrench body 11 is withdrawn from its position of FIG. 24, the spring 223 will return plunger 220 to the position of FIG. 22.

It can thus be seen that the wrench of FIGS. 22-28 supports and retains a polygonal nut in a stable manner prior to the time that it is threaded onto stud 202. Furthermore, by supporting it in this manner, the alignment of the nut 201 with stud 202 is enhanced, which tends to obviate a crooked threading of the nut onto the stud. It is to be noted from FIG. 27 that there is a loose fit between the plunger body 219 and the inner wall 217 of the wrench body so that if the nut is not exactly aligned with the stud, plunger body 219 can tilt to permit such alignment.

While preferred embodiments of the present invention has been disclosed, it will be appreciated that it is not limited thereto but may be otherwise embodied within the scope of the following claims.

What is claimed is:

1. A wrench for turning a nut having a threaded bore therein comprising a wrench body having a bore therein and an open end, first means proximate said open end for entering said threaded bore and mounting said nut thereon, second means proximate said open end for releasably supporting said nut while said first means is located in said threaded bore, third means proximate said open end for effecting a turning relationship with said nut, and fourth means for exerting a yieldable force on said first means to permit said first means to move out of said threaded bore of said nut as a stud enters said threaded bore as said nut is being mounted on said stud, said nut having a polygonal outer surface, and said second means comprising spring means for engaging said polygonal outer surface.

2. A wrench as set forth in claim 1 including a keyed relationship between said slidable member and said bore in said wrench body.

3. A wrench as set forth in claim 1 wherein said third means comprises a bore in said wrench body for receiving said nut and engaging said polygonal outer surface thereof.

4. A wrench for turning a nut having a threaded bore therein comprising a wrench body having a bore therein and an open end, first means proximate said open end for entering said threaded bore and mounting said nut thereon, second means proximate said open end for releasably supporting said nut while said first means is located in said threaded bore, third means proximate said open end for effecting a turning relationship with said nut, fourth means for exerting a yieldable force on said first means to permit said first means to move out of said threaded bore of said nut as a stud enters said threaded bore as said nut is being mounted on said stud, said first means comprising a slidable member within said bore of said wrench body, a tip on said slidable member for entering said threaded bore, said nut having a polygonal outer surface, and said second means comprising spring means for engaging said polygonal outer surface.

5. A wrench as set forth in claim 4 wherein said spring means comprises an annular spring.

6. A wrench as set forth in claim 5 including a groove in said wrench body, and wherein said annular spring is retained in said groove.

7. A wrench as set forth in claim 4 including a keyed relationship between said slidable member and said bore in said wrench body.

8. A wrench as set forth in claim 7 wherein said spring means comprises an annular spring.

9. A wrench as set forth in claim 8 including a groove in said wrench body, and wherein said annular spring is retained in said groove.

10. A wrench for turning a nut having a threaded bore therein comprising a wrench body having a bore therein and an open end, first means proximate said open end for entering said threaded bore and mounting said nut thereon, second means proximate said open end for releasably supporting said nut while said first means is located in said threaded bore, third means proximate said open end for effecting a turning relationship with said nut, fourth means for exerting a yieldable force on said first means to permit said first means to move out of said threaded bore of said nut as a stud enters said threaded bore as said nut is being mounted on said stud, said first means comprising a slidable member within said bore of said wrench body, a tip on said slidable member for entering said threaded bore, said nut having a polygonal surface, said third means comprising an internal configuration of said bore in said wrench body for effecting a turning relationship with said nut, and said second means comprising spring means for engaging said polygonal outer surface.

11. A wrench as set forth in claim 10 including a keyed relationship between said slidable member and said bore in said wrench body.

12. A wrench as set forth in claim 10 wherein said spring means comprises an annular spring.

13. A wrench for selectively turning either a conventional polygonal nut having a threaded bore therein or a locknut having a threaded bore therein comprising a wrench body having a bore therein and an open end, first means proximate said open end for entering said threaded bore of either said conventional polygonal nut or said locknut and mounting either of said nuts thereon, second means proximate said open end for releasably supporting either of said nuts while said first means is located in said threaded bore, third means proximate said open end for effecting a turning relationship with said conventional polygonal nut, fourth means proximate said open end for effecting a turning relationship with said locknut, and fifth means for exerting a yieldable force on said first means to permit said first means to move out of said threaded bore of either of said nuts as a stud enters said threaded bore of either of said nuts as it is being mounted on said stud.

14. A wrench as set forth in claim 13 wherein said first means comprises a slidable member within said bore of said wrench body, and a tip on said slidable member for entering said threaded bore of either of said conventional polygonal nut or said locknut.

15. A wrench as set forth in claim 14 including a keyed relationship between said slidable member and said bore in said wrench body.

16. A wrench for selectively turning either a conventional polygonal nut having a threaded bore therein or a locknut having a threaded bore therein comprising a wrench body having a bore therein and an open end, first means proximate said open end for entering said threaded bore of either said conventional polygonal nut or said locknut and mounting either of said nuts thereon, second means proximate said open end for releasably supporting either of said nuts while said first means is located in said threaded bore, third means proximate said open end for effecting a turning relationship with either of said nuts, fourth means for exerting a yieldable force on said first means to permit said first means to move out of said threaded bore of either of said nuts as a stud enters said threaded bore of either of said nuts as it is being mounted on said stud, said first means comprising a slidable member within said bore of said wrench body, a tip on said slidable member for entering said threaded bore of either of said conventional polygonal nut or said locknut, said conventional polygonal nut having a polygonal outer surface, and said second means comprising spring means for engaging said polygonal outer surface.

17. A wrench as set forth in claim 16 wherein said third means comprises an internal configuration for effecting a keyed relationship with said polygonal outer surface of said conventional polygonal nut.

18. A wrench as set forth in claim 16 wherein said locknut has an outer surface and wherein said second means comprises a bore in said slidable member for receiving said outer surface of said locknut.

19. A wrench as set forth in claim 18 wherein said third means comprises a configuration in said bore in said wrench body for effecting a turning relationship with said polygonal outer surface of said conventional polygonal nut.

20. A wrench as set forth in claim 19 including a keyed relationship between said slidable member and said bore in said wrench body.

21. A wrench as set forth in claim 18 including a keyed relationship between said slidable member and said bore in said wrench body.

22. A wrench for selectively turning either a conventional polygonal nut having a threaded bore therein or a locknut having a threaded bore therein comprising a wrench body having a bore therein and an open end, first means proximate said open end for entering said threaded bore of either said conventional polygonal nut or said locknut and mounting either of said nuts thereon, second means proximate said open end for releasably supporting either of said nuts while said first means is located in said threaded bore, third means proximate said open end for effecting a turning relationship with either of said nuts, and fourth means for exerting a yieldable force on said first means to permit said first means to move out of said threaded bore of either of said nuts as a stud enters said threaded bore of either of said nuts as it is being mounted on said stud, said second means comprising spring means for engaging the outer surface of said conventional polygonal nut, and said third means comprising a bore in said slidable member for receiving the body of said locknut.

23. A wrench as set forth in claim 22 wherein said third means comprises a first configuration in said bore of said wrench body for effecting a first keyed relationship with said outer surface of said conventional polygonal nut and a second configuration on said slidable member for effecting a second keyed relationship with said locknut.

24. A wrench for selectively turning either a conventional polygonal nut having a threaded bore therein or a locknut having a threaded bore therein comprising a wrench body having a bore therein and an open end, first means proximate said open end for entering said threaded bore of either said conventional polygonal nut or said locknut and mounting either of said nuts thereon, second means proximate said open end for releasably supporting either of said nuts while said first means is located in said threaded bore, third means proximate said open end for effecting a turning relationship with either of said nuts, and fourth means for exerting a yieldable force on said first means to permit said first means to move out of said threaded bore of either of said nuts as a stud enters said threaded bore of either of said nuts as it is being mounted on said stud, said third means comprising a first configuration in said bore of said wrench body for effecting a first keyed relationship with said outer surface of said conventional polygonal nut and a second configuration on said slidable member for effecting a second keyed relationship with said locknut.

* * * * *